United States Patent
Di Pietro et al.

(10) Patent No.: US 10,484,255 B2
(45) Date of Patent: Nov. 19, 2019

(54) TRUSTWORTHINESS INDEX COMPUTATION IN A NETWORK ASSURANCE SYSTEM BASED ON DATA SOURCE HEALTH MONITORING

(71) Applicant: Cisco Technology, Inc., San Jose, CA (US)

(72) Inventors: Andrea Di Pietro, Lausanne (CH); Grégory Mermoud, Veyras (CH); Jean-Philippe Vasseur, Saint Martin d'uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 332 days.

(21) Appl. No.: 15/626,412

(22) Filed: Jun. 19, 2017

(65) Prior Publication Data

US 2018/0367428 A1    Dec. 20, 2018

(51) Int. Cl.
| | |
|---|---|
| *H04L 12/26* | (2006.01) |
| *H04L 29/06* | (2006.01) |
| *G06F 16/2457* | (2019.01) |
| *H04L 12/24* | (2006.01) |
| *G06N 20/00* | (2019.01) |

(52) U.S. Cl.
CPC .... *H04L 43/0817* (2013.01); *G06F 16/24578* (2019.01); *G06N 20/00* (2019.01); *H04L 41/0213* (2013.01); *H04L 41/145* (2013.01); *H04L 41/147* (2013.01); *H04L 63/1408* (2013.01); *H04L 41/0816* (2013.01); *H04L 43/08* (2013.01); *H04L 43/10* (2013.01); *H04L 63/1433* (2013.01)

(58) Field of Classification Search
CPC ..... H04L 43/08–50; H04L 63/14–1433; H04L 41/00–147; G06F 16/24–245; G06N 20/00–20
See application file for complete search history.

(56) References Cited

U.S. PATENT DOCUMENTS

| | | | |
|---|---|---|---|
| 7,003,564 B2 | 2/2006 | Greuel et al. | |
| 8,645,102 B2 | 2/2014 | Golani et al. | |
| 9,098,555 B2 | 8/2015 | Bjork et al. | |
| 9,439,081 B1* | 9/2016 | Knebl | H04W 16/18 |
| 2014/0222996 A1* | 8/2014 | Vasseur | H04L 41/16 709/224 |
| 2014/0280899 A1 | 9/2014 | Brewster, Jr. et al. | |

(Continued)

*Primary Examiner* — Clayton R Williams
(74) *Attorney, Agent, or Firm* — Behmke Innovation Group LLC; James Behmke; Stephen D. LeBarron

(57) ABSTRACT

In one embodiment, a device receives health status data indicative of a health status of a data source in a network that provides collected telemetry data from the network for analysis by a machine learning-based network analyzer. The device maintains a performance model for the data source that models the health of the data source. The device computes a trustworthiness index for the telemetry data provided by the data source based on the received health status data and the performance model for the data source. The device adjusts, based on the computed trustworthiness index for the telemetry data provided by the data source, one or more parameters used by the machine learning-based network analyzer to analyze the telemetry data provided by the data source.

20 Claims, 6 Drawing Sheets

(56) References Cited

U.S. PATENT DOCUMENTS

| | | | |
|---|---|---|---|
| 2016/0034823 A1* | 2/2016 | Farkas | H04W 16/22 |
| | | | 706/12 |
| 2016/0183109 A1 | 6/2016 | Kiesekamp et al. | |
| 2016/0350539 A1* | 12/2016 | Oberheide | G06F 21/577 |
| 2016/0373306 A1* | 12/2016 | Saha | H04W 4/80 |
| 2017/0250855 A1* | 8/2017 | Patil | H04L 47/827 |

* cited by examiner

TRUSTWORTHINESS INDEX COMPUTATION IN A NETWORK ASSURANCE SYSTEM BASED ON DATA SOURCE HEALTH MONITORING

TECHNICAL FIELD

The present disclosure relates generally to computer networks, and, more particularly, to trustworthiness index computation in a network assurance system based on data source health monitoring.

BACKGROUND

Many network assurance systems rely on predefined rules to determine the health of the network. In turn, these rules can be used to trigger corrective measures and/or notify a network administrator as to the health of the network. For instance, in an assurance system for a wireless network, one rule may comprise a defined threshold for what is considered as an acceptable number of clients per access point (AP) or the channel interference, itself. More complex rules may also be created to capture conditions over time, such as a number of events in a given time window or rates of variation of metrics (e.g., the client count, channel utilization, etc.).

As networks continue to evolve, the number of behaviors that a network assurance system must assess is also rapidly increasing. For example, as the quantity and variety of wireless clients increases in a network, this introduces new behaviors into the network, such as different traffic loads experienced by the deployed APs, potentially new considerations from a quality of service (QoS) standpoint, etc. Thus, the number of network assurance rules to be maintained is also rapidly increasing and will soon become too unwieldy for many entities.

Machine learning presents a promising alternative to using static rules for purposes of network assurance. However, no single machine learning-based approach is able to assess all use cases, in accordance with the "No Free Lunch" Theorem. In addition, the quality of the input data to a machine learning-based behavioral model can easily affect the operation of the model and lead to incorrect results, in some cases.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
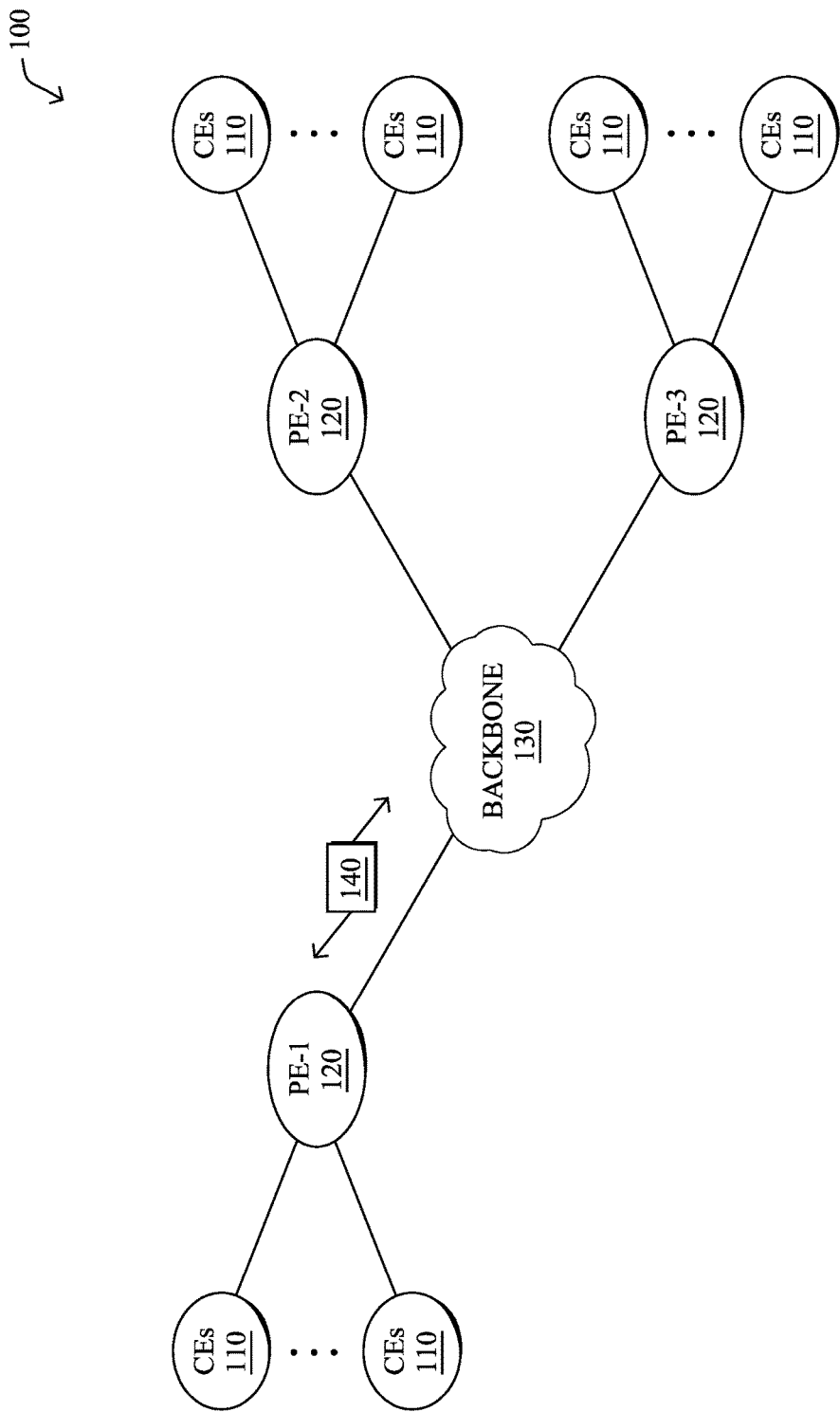
FIGS. 1A-1B illustrate an example communication network.

According to one or more embodiments of the disclosure, a device receives health status data indicative of a health status of a data source in a network that provides collected telemetry data from the network for analysis by a machine learning-based network analyzer. The device maintains a performance model for the data source that models the health of the data source. The device computes a trustworthiness index for the telemetry data provided by the data source based on the received health status data and the performance model for the data source. The device adjusts, based on the computed trustworthiness index for the telemetry data provided by the data source, one or more parameters used by the machine learning-based network analyzer to analyze the telemetry data provided by the data source.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
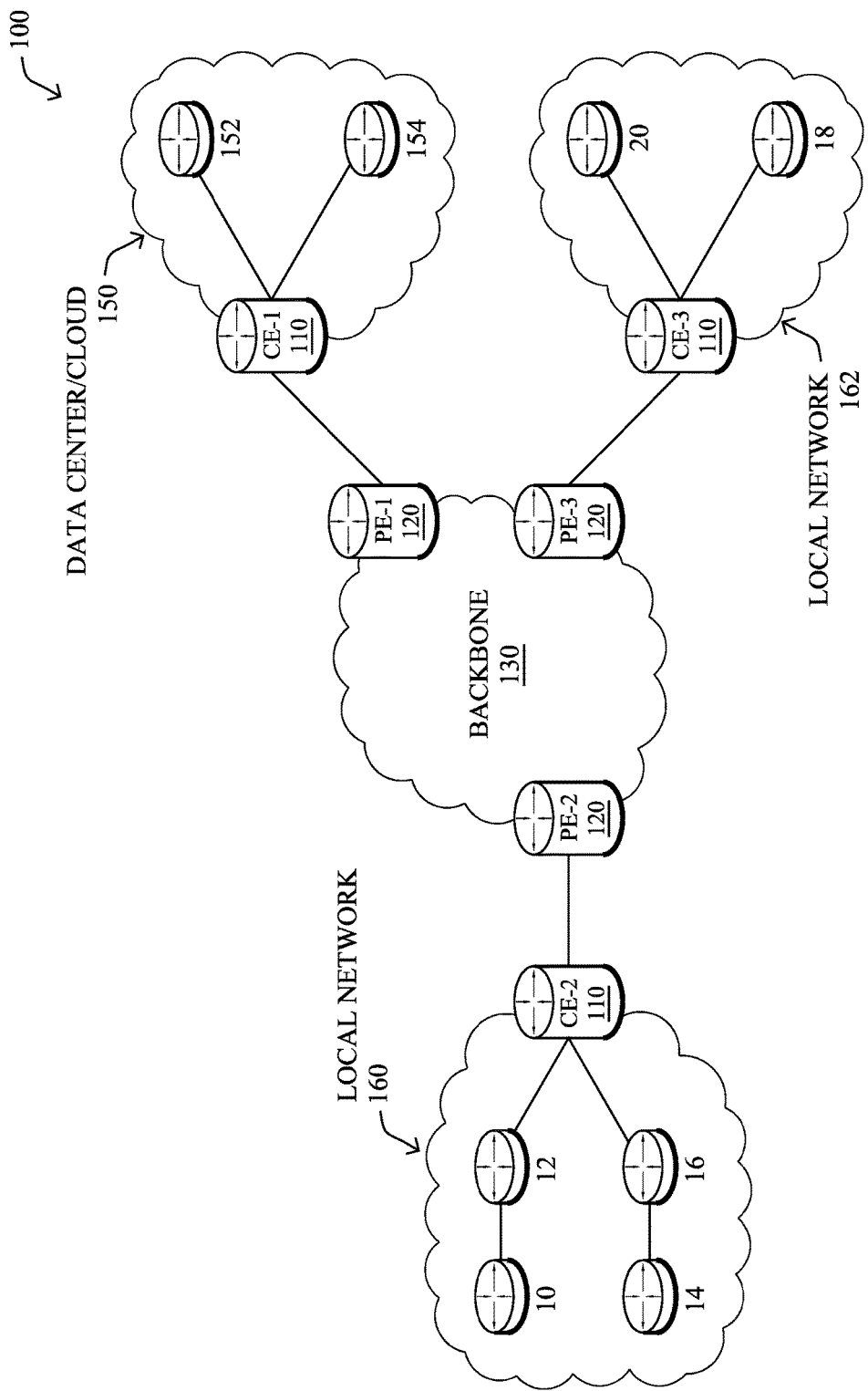

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
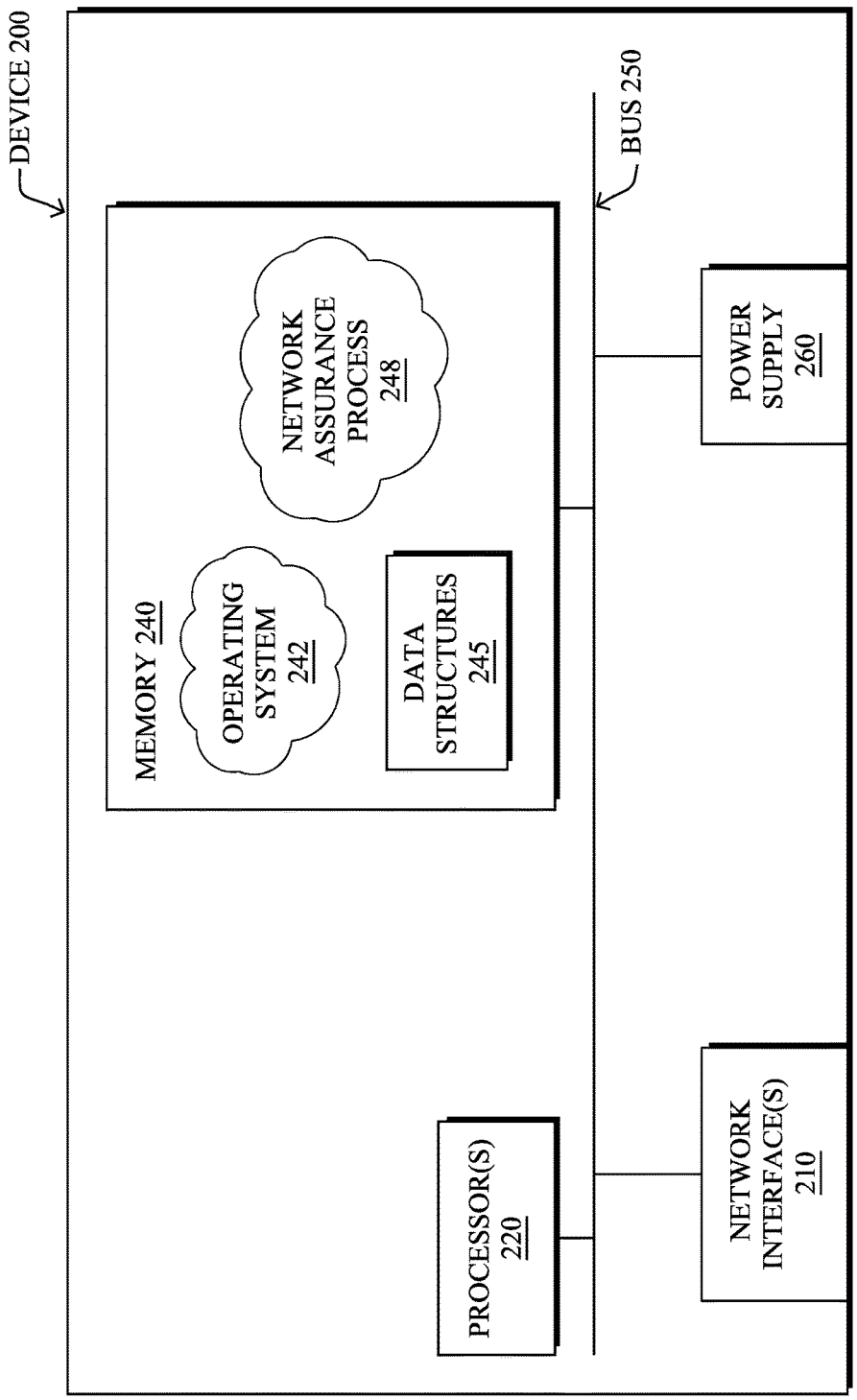
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
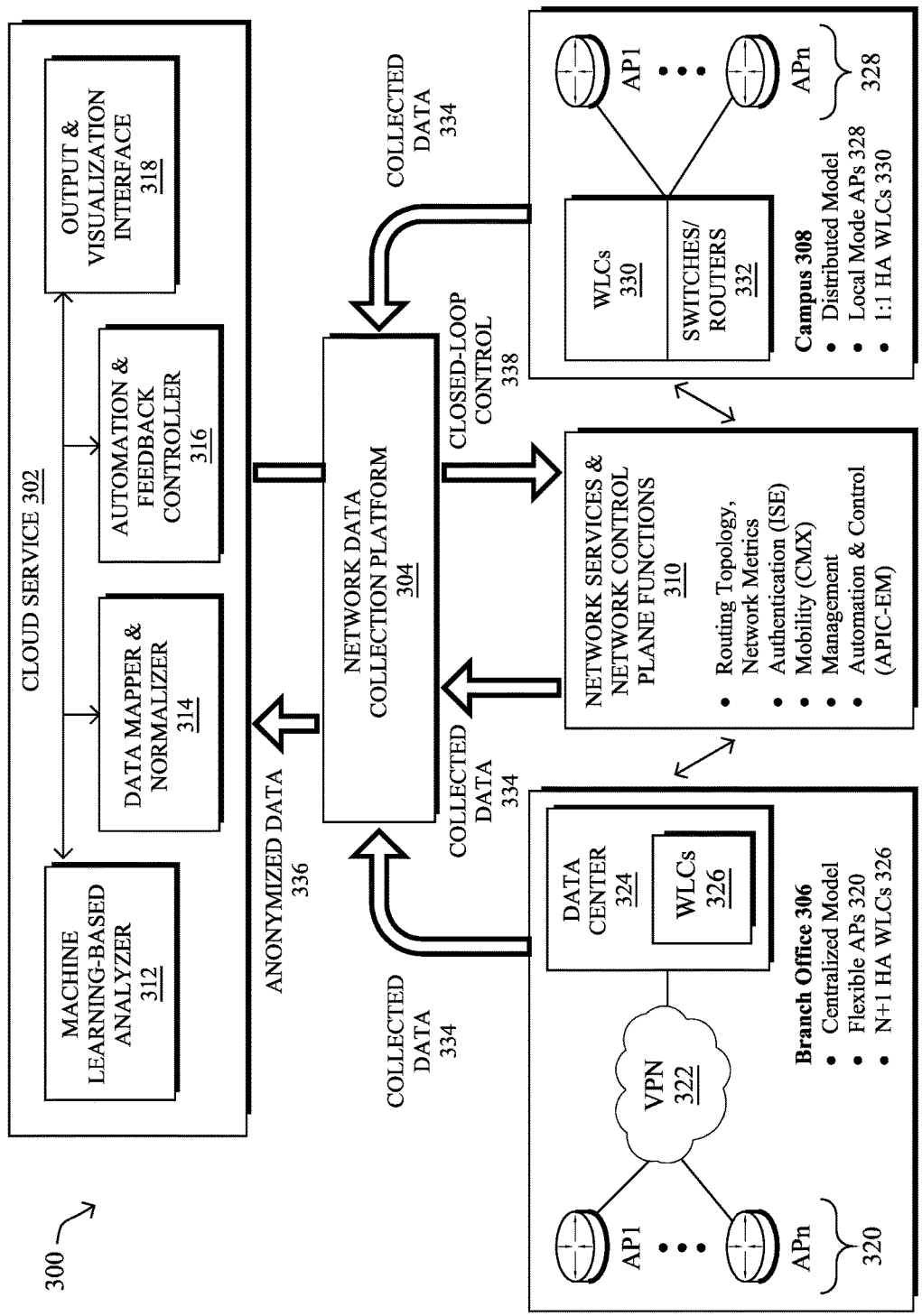
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint device, networking device in branch office 306 or campus 308, or a network service or control plane function 310, to adjust its operations (e.g., by signaling an endpoint to use a particular AP 320 or 328, etc.).

As noted above, network assurance system 300 shown in FIG. 3, may gather collected data 334 from any number of network elements/data sources deployed in a monitored network, such as branch office 306 and/or campus 308. Such telemetry data regarding the monitored network may also be assessed by one or more machine learning-based processes of analyzer 312, for purposes of cognitive analytics, predictive analytics, and/or trending analytics. However, particularly in the case of using collected telemetry data as input to a machine learning-based analyzer, the precision and cleanliness of the input data is vital to the proper operation of the analyzer. Notably, during normal network operations, it has been observed that the following issues may affect the data collection:

Data losses during data collection/reporting—The collected telemetry data may only be partially reported or sampled (e.g., when resources are limited on the data source), the telemetry data packets are dropped/lost in transit (e.g., when an unreliable protocol is used, such as UDP), etc.

Delays in the data collection/reporting—The telemetry data arrives later than needed at data collection platform 304 and/or cloud service 302. Such delays may be due, for example, to network congestion, network element failures, planned outages, and the like. As a more specific example, a WLC controller 326 can be slow in replying to SNMP queries issued by data collection platform 304, so that the collected data 334 in the same table are sampled at significantly different points in time. This has been observed in live networks where SNMP can take potentially dozens of minutes.

Inconsistent data—The collected data 334 can also appear inconsistent due, for example, to timing issues, overlapping counter refresh, counter rollover, or state changes in the middle of data gathering.

In any of the above situations, the viability of the machine learning process(es) that assess the collected telemetry data may be called into question. For example, consider the case of an anomaly detection process that detects sudden changes in the behavior of a client, networking device, or other component of the monitored network. If there are inconsistencies in the collected data, such a model may mistake the inconsistencies as representing an actual problem in the network that affects users, as opposed to an issue present only in the telemetry collection mechanism of the network assurance system.

Trustworthiness Index Computation in a Network Assurance System Based on Data Source Health Monitoring The techniques herein introduce a way to automatically attribute a trustworthiness index to a data source for a network assurance system that is based on the health metrics of the data source. In some aspects, the system may use the index to adjust the one or more parameters of a machine learning-based network analyzer that assesses the network. For example, the telemetry data collected from the data source may be weighted according to the trustworthiness index of the data source/telemetry data from the data source, when input to the network analyzer. In particular, the proposed mechanism enables the network assurance system to learn the relationship between some network conditions (e.g., CPU usage by a monitored network device, network delay, network congestion, etc.) and the quality of the data that has been obtained by the system for analysis.

Specifically, according to one or more embodiments of the disclosure as described in detail below, a device receives health status data indicative of a health status of a data source in a network that provides collected telemetry data from the network for analysis by a machine learning-based network analyzer. The device maintains a performance model for the data source that models the health of the data source. The device computes a trustworthiness index for the telemetry data provided by the data source based on the received health status data and the performance model for the data source. The device adjusts, based on the computed trustworthiness index for the telemetry data provided by the data source, one or more parameters used by the machine learning-based network analyzer to analyze the telemetry data provided by the data source.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
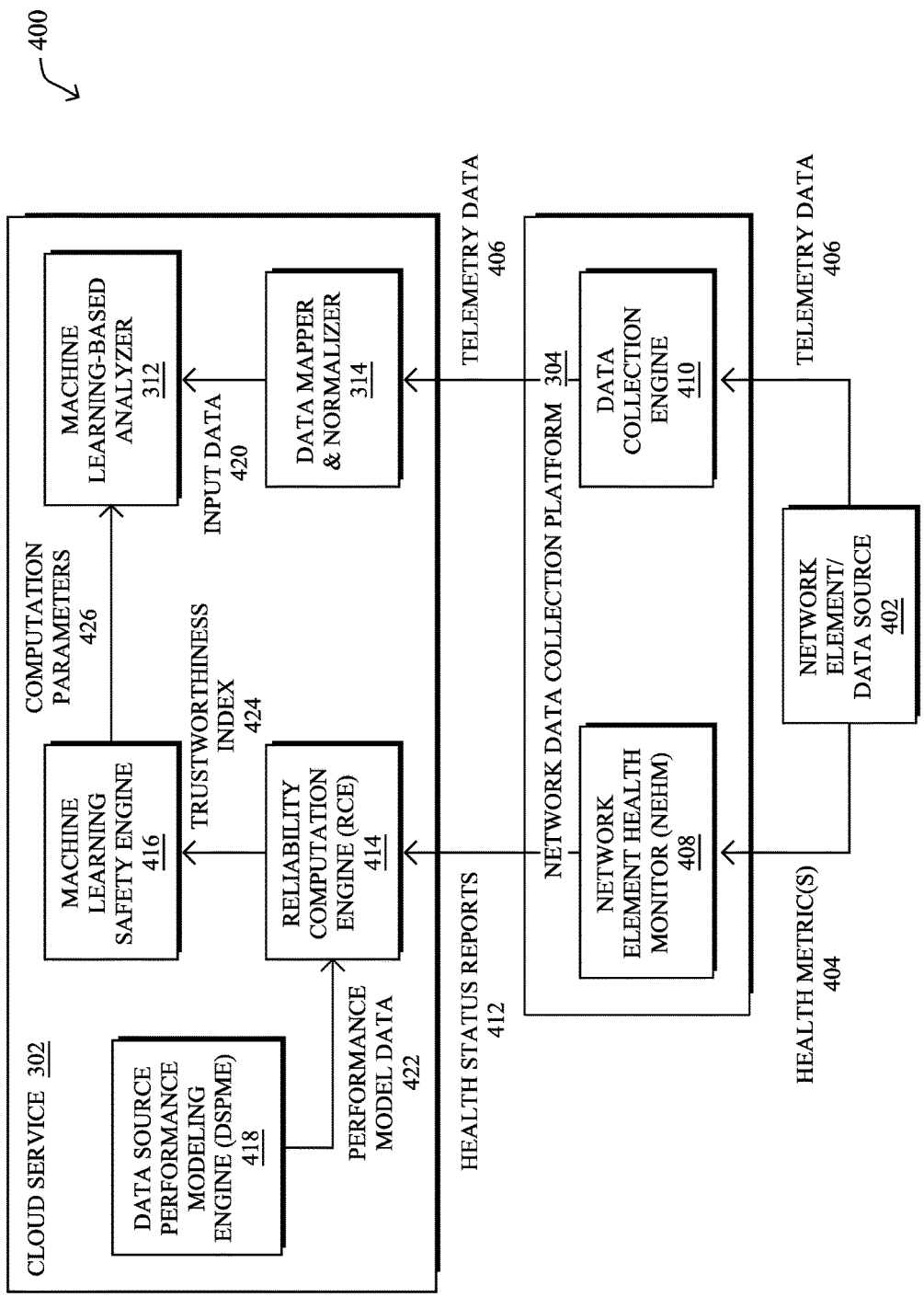
FIG. 4 illustrates an example architecture for trustworthiness index computation in a network assurance system based on data source health monitoring.

Operationally, FIG. 4 illustrates an example architecture 400 for trustworthiness index computation in a network assurance system based on data source health monitoring, in accordance with various embodiments. As shown, architecture 400 may include any or all of the following components: a network element/data source 402, a network element health monitor (NEHM) 408, a data collection engine 410, a reliability computation engine (RCE) 414, a machine learning safety engine, and/or a data source performance modeling engine (DSPME) 418.

In various embodiments, the components of architecture 400 may be implemented within a network assurance system, such as system 300 shown in FIG. 3. Accordingly, the components of architecture 400 shown may be implemented as part of cloud service 302, as part of network data collection platform 304, and/or on network element/data source 402 itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

As shown and continuing the example of FIG. 3, a network assurance system may rely on telemetry data collection and reporting by a given network element/data source 402 deployed in the local network under scrutiny. For example, data source 402 may be a router, switch, access point, wireless controller (e.g., WLC, etc.), or any other form of network element configured to collect and report telemetry data to network data collection platform 304.

In particular, as discussed above, data source 402 may provide telemetry data 406 to a data collection engine 410 in network collection platform 304 for analysis by analyzer 312, either on a push or pull basis. In turn, data collection engine 410 may forward the telemetry data 406 on to data mapper & normalizer 314 in cloud service 302. Also as detailed above, data mapper & normalizer 314 may map and normalize the telemetry data 406 into input data 420 for assessment by machine learning-based analyzer 312. For example, telemetry data 406 may indicate the number of clients attached to a given AP, which is one of the input factors considered by analyzer 312 when determining whether a configuration change is needed in the monitored network (e.g., by generating an alert for output & visualization interface 318, by using automation & feedback controller 316 to automatically implement the change, etc.).

In various embodiments, one component of architecture 400 is network element health monitor (NEHM) 408, which is configured to collect any number of health metrics 404 about data source 402, either on a push or pull basis. Examples of health metrics 404 may include, but are not limited to, the following:

The number of dropped telemetry packets for telemetry data 406, such as Netflow or IPFIX records, SNMP packets, WSA Record packets, etc.

Resource utilization by data source 402, such as CPU or memory utilization.

The response delay of SNMP queries associated with data source 402.

The overall duration of an SNMP walk associated with data source 402. In general, such an operation may be used to poll the SNMP values available from data source 402. However, doing so can also have an impact on the data itself, since long walks will contain counters which have effectively been sampled at considerably different times, with negative effects on the overall consistency of the data.

As shown, NEHM 408 may be co-located with data collection engine 410 as part of network data collection platform 304 (e.g., in case of Netflow records, the number of drops can be inferred from the sequence number). However, in further embodiments, NEHM 408 may be located in whole, or in part, on data source 402, itself. For example, a local NEHM 408 of data source 402 may monitor CPU consumption by the network element, which cannot be monitored directly via SNMP. In other cases, some or all of health metrics 404 may be obtained by NEHM 408 from another device in the network that is configured to monitor the health status of network element/data source 402.

A key aspect of the techniques herein is that the collection of the health metrics 404 regarding data source 402 is orthogonal to the collection of the telemetry data 406 from data source 402 that will be used by analyzer 312 for modeling. In fact, in many implementations, health metrics 404 may not be directly processed by the machine learning-based network analyzer (e.g., analyzer 312) at all. Instead, health metrics 404 may be used by the network assurance system to assess the reliability and quality of the input telemetry data 420 which is assessed by analyzer 312.

In one embodiment, NEHM 408 may dynamically determine which health metrics 404 are to be tracked, based on the telemetry data 406 actually used by analyzer 312. For example, if machine learning-based analyzer 312 uses Netflow data as input feature data, NEHM 408 may track the interface metrics/statistics on which Netflow is enabled on data source 402. Doing so allows the network assurance system to determine how much traffic the network element/data source 402 is experiencing, as high network traffic can have an effect on the Netflow engine (e.g., data source 402 may provide only partial records, reduce its reporting frequency, etc.). On the contrary, if Netflow records are not included in telemetry data 406, NEHM 408 may not need to track interface statistics for data source 402. In one embodiment, this dynamic determination of health metrics 406 to be tracked can be selected by NEHM 408 from a static database that maps health metrics to an indication of the relevance of the health aspect that they capture.

After capturing health metrics 404 regarding data source 402, NEHM 408 may provide health status reports 412 derived therefrom to reliability computation engine (RCE) 414 (e.g., periodically, on demand, etc.). Health status reports 412 may generally be indicative of the health status of network element/data source 402. For example, health status reports 412 may include raw health metrics 404 regarding data source 402, condensed or summarized forms of health metrics 404, health status inferences based on health metrics 404, combinations thereof, or the like.

In another embodiment, RCE 414 can configure NEHM 408 by sending it a custom warning configuration message that specifies the condition(s) and/or frequency under which NEHM 408 should provide health status reports 412. Such conditions and/or frequency may be based on the output of analyzer 312, in some cases. For example, the warning configuration message can specify a number of Netflow drops or a CPU utilization threshold which will cause NEHM 408 to start sending data to RCE 414. Also, the message can specify a "monitoring period" during which NEHM 408 may continue to export health status reports 412 after the conditions specified in the message have been verified.

In addition to health metrics 404, NEHM 408 may also base health status reports 412 on contextual information collected from the network regarding network element/data source 402. For example, such contextual information may indicate the number of APs managed by a WLC, the amount of traffic processed by a router, etc. This information will allow for a better determination to be made of the expected values for some performance parameters. For example, the duration of an SNMP walk on a WLC managing thousands of clients will necessarily be longer than on a WLC managing hundreds of clients.

In various embodiments, RCE 414 may be configured to compute a trustworthiness index 424 of the input data 420 to analyzer 312, based on the health metrics 404 collected by NEHM 408. This can be done only by knowing the relationships between the health metrics 404 and the corresponding telemetry data 406 being used for analytics by analyzer 312. Accordingly, RCE 414 may track these relationships and encode the impact on quality/reliability. For example, when SNMP data is being used for analytics, the quality of this telemetry data 406 is directly impacted on by the CPU, memory, and state (e.g., number of APs, clients, etc.) of data source 402, which can be obtained as health metrics 404. Hence, RCE 414 may encode this relationship and note that if any of the above health metric values are higher than a baseline, the quality of the corresponding telemetry data used as input to analyzer 312 should be weighted lower, so as to lessen the impact of low quality input data 420.

Similar to the above, RCE 414 may encode many such relationships between health metrics and telemetry data quality that can be used to dynamically adjust network data collection platform 304. RCE 414 may also rely on other sources of information, to assess the relationship between quality of input data 420 and networking events indicative of the health status of data source 402. For example, a network management system (NMS) may send information to RCE 414 regarding a planned outage, upgrade to a new version that could potentially lead to issues during data collection, known issues such as bad counters, etc., any of which can be used by RCE 414 to determine trustworthiness index 424.

As shown, RCE 414 may further interact with data source performance modeling engine (DSPME) 418, which is responsible for modeling the performance of data source 402 and providing performance model data 422 to RCE 414. For example, RCE 414 may send a performance model request to DSPME 418 that includes any or all of the following:

The model and the type of data source 402;
Some contextual information regarding data source 402 (e.g. number of client for a WLC, amount of traffic for a router, etc.).

In turn, DSPME 418 may send a performance model response message to RCE 414 that includes performance model data 422 which will be used by RCE 414 for assigning a trustworthiness index 424 to input data 420 based on the received performance metrics/health status reports 412. Notice that such a performance model can be cached by RCE 414 for a pre-defined amount of time. This kind of computation by RCE 414 can also be carried out by using any number of different types of models.

In one embodiment, RCE 414 may compute trustworthiness index 424 by modelling the normal behavior of data source 402 (e.g., by modelling the WLC CPU and memory consumption when the network element is operating under normal conditions, etc.). In such a case, trustworthiness index 424 may generally represents the likelihood of the measured health metrics 404 being observed for data source 402 with respect to the performance model for data source 402. In greater detail, any non-supervised machine learning process can be used for this modelling, ranging from Gaussian mixtures to more advanced techniques such as Restricted Boltzmann Machines or 1-class SVMs. Thus, RCE 414 may compute trustworthiness index 424 as the inverse of the likelihood of the performance/health metric 404 for data source 402 (e.g., the more "normal" the performance/health indices of data source 402, the more reliable the telemetry data 406 provided by data source 402).

In another embodiment, the performance model used by RCE 414 to compute trustworthiness index 424 is a regression function which allows RCE 414 to directly compute trustworthiness index 424 from the performance/health metrics in health status reports 412 based on a supervised machine learning process (e.g., ANNs, etc.). By its very nature, this means that the supervised learning process must first be trained using a training data set that includes example health status data labeled with corresponding trustworthiness indexes. In turn, this training data can be used to train the regression model. In order to create such a training data set, data from known, well-behaving data sources can be mixed with data produced by sources with well-known issues (e.g., data produced by a Netflow record source that is experiencing link congestion, etc.).

As noted, DSPME 418 may be configured to compute the machine learning-based model used to assess the performance/health of data source 402, for purposes of computing trustworthiness index 424. In case a non-supervised model is used, RCE 414 may forward health status reports 412 from NEHM 408 to DSPME 418, allowing DSPME 418 to build and update the data source performance models. In particular, abnormal conditions, such as saturated CPUs and network, will show up in such a model with lower probability, thus implying a lower trustworthiness index. Note also that any contextual data present in reports 412 may allow DSPME 418 to build different performance models for different data source types.

In case a supervised learning model is used to evaluate data source 402, a training set including labels has to be built and updated. In particular, a trustworthiness index has to be provided for a number of input samples of health metrics, as part of the training data set for the performance model. This can be done by using the following procedure:

1. Given an input data sample $X_{data}$, collected from a data source characterized by the performance metrics $X_{metric}$, compute the machine learning engine output, $Y(X_{data})$.
2. Compute an error metric associated with Y(Xdata). The computation of this error metrics will depend on the particular machine learning engine and may need the intervention of a human expert. For example, if Y is a predicted joining time, the error metric will be computed as the difference between predicted and measured joining time.
3. Compute a trustworthiness index as a function of the error metric.
    a. Attribute such computed trustworthiness index as the label for $X_{metrics}$. Such a training set can be computed at system bootstrap and periodically updated.

Regardless of the type of performance model used for data source 402, RCE 414 may provide the computed trustworthiness index 424 to machine learning safety engine 416 using a custom notification message. In turn, in various embodiments, machine learning safety engine 416 may adjust one or more computation parameters 426 used by machine learning-based analyzer 312 when analyzing input data 420. In particular, in some embodiments, computation parameters 426 may disable some or all input data 420 for analysis by one or more of the machine learning processes of analyzer 312. For example, if the trustworthiness index of input data 420 and data source 402 is below a threshold, machine learning safety engine 416 may simply disable its analysis by machine learning-based analyzer 312. In further embodiments, computation parameters 426 may apply a weighting to input data 420 that takes into account trustworthiness index 424, as well as potentially the error tolerance of the particular machine learning process performing the analysis on input data 420.

Figure 5:
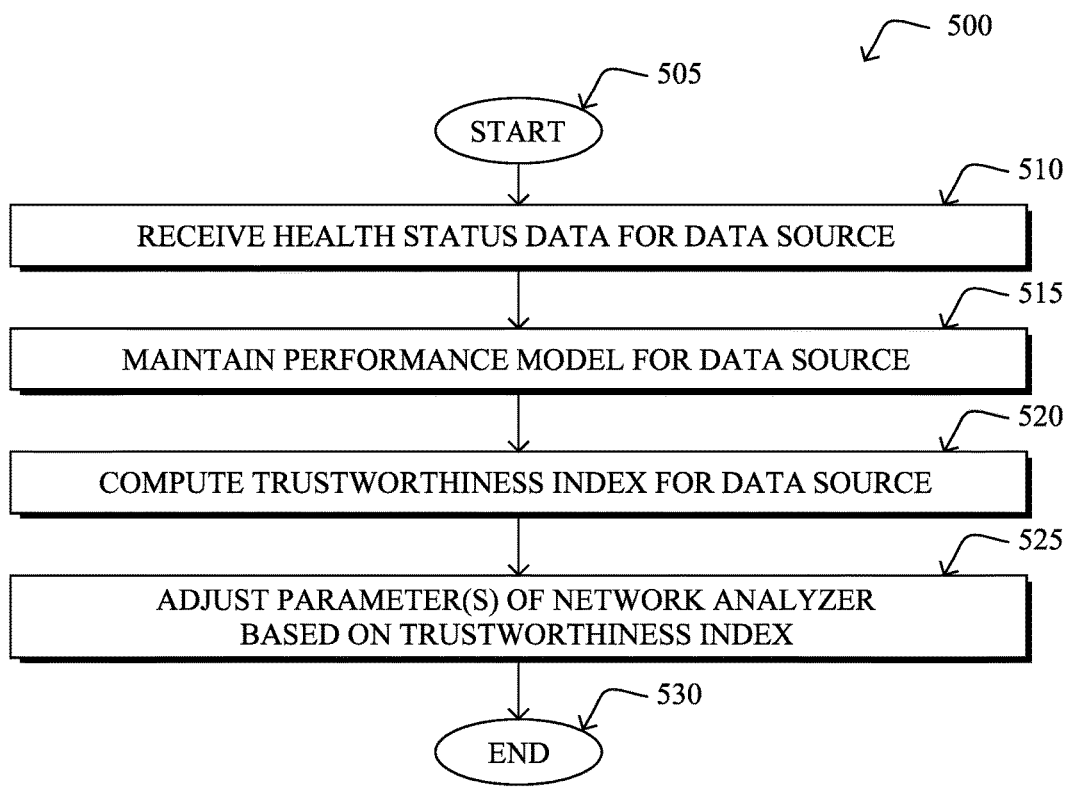
FIG. 5 illustrates an example simplified procedure for using a trustworthiness index for a data source in a network assurance system.

FIG. 5 illustrates an example simplified procedure for using a trustworthiness index for a data source in a network assurance system, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may receive health status data indicative of a health status of a data source in a network. In general, the data source may provide collected telemetry data from the network for analysis by a machine learning-based network analyzer. Example health status data may include one or more of: a count of dropped telemetry packets of the provided telemetry data, resource utilization by the data source, a response delay of SNMP queries associated with the data source, or a duration of time associated with performing an SNMP walk of the data source. Further, the health status data may differ from the telemetry data provided by the data source and, potentially, the telemetry data may even be indicative of a behavior of one or more devices in the monitored network that differ from the data source.

At step 515, as detailed above, the device may maintain a performance model for the data source. In one embodiment, the performance model may be an unsupervised machine learning-based model that determines a likeliness of the health status being observed for the data source. In another embodiment, the performance model may be a supervised machine learning-based model that was trained using a training set of health status data labeled with trustworthiness indexes.

At step 520, the device may compute a trustworthiness index for the telemetry data provided by the data source based on the received health status data and the performance model for the data source, as described in greater detail above. For example, in the case of the performance model for the data source being a supervised learning model, the device may use the model to determine a trustworthiness index (e.g., a trained label) based on the health status data for the data source that provides the telemetry data. In other cases, the performance model may determine how far the health status of the data source is from an expected health status and, in turn, the device can covert this information into the trustworthiness index.

At step 525, as detailed above, the device may adjust, based on the computed trustworthiness index for the telemetry data provided by the data source, one or more parameters used by the machine learning-based network analyzer to analyze the telemetry data provided by the data source. In some embodiments, this may entail disabling analysis of at least a portion of the telemetry data by the network analyzer based on the trustworthiness index computed for the telemetry data provided by the data source. For example, the device may prevent one or more machine learning processes of analyzer from analyzing at least a portion of the provided telemetry data. In further embodiments, adjusting the one or more parameters of the network analyzer may entail assigning one or more weightings to the telemetry data input to the analyzer. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a machine learning-based network assurance system to verify whether telemetry data analyzed by the system has been corrupted, skewed, or is otherwise inconsistent, based on health status data for the data source. This is particularly true when the telemetry data has entered one of these conditions temporarily because of adverse network conditions, device resource saturation, or even change in state of the data source that could occur during the collection process. For example, even a Netflow source which provides correct Netflow information can be considered unreliable if too many Netflow packets have been dropped due to network congestion, which will result in missing flow information.

While there have been shown and described illustrative embodiments that provide for trustworthiness index computation in a network assurance system based on data source health monitoring, it is to be understood that various other adaptations and modifications may be made within the spirit and scope of the embodiments herein. For example, while certain embodiments are described herein with respect to using certain models for purposes of performance modeling and/or network analysis, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
 receiving, at a device, health status data indicative of a health status of a data source in a network that provides collected telemetry data from the network for analysis by a machine learning-based network analyzer;
 maintaining, by the device, a performance model for the data source that models the health of the data source;
 computing, by the device, a trustworthiness index for the telemetry data provided by the data source based on the received health status data and the performance model for the data source; and
 adjusting, by the device and based on the computed trustworthiness index for the telemetry data provided by the data source, one or more parameters used by the machine learning-based network analyzer to analyze the telemetry data provided by the data source.

2. The method as in claim 1, wherein the one or more parameters used by the machine learning-based network analyzer to analyze the telemetry data provided by the data source comprise one or more weightings applied to the telemetry data.

3. The method as in claim 1, wherein the performance model for the data source that models the health of the data source comprises an unsupervised machine learning-based model that determines a likeliness of the health status being observed for the data source.

4. The method as in claim 1, wherein the performance model for the data source that models the health of the data source comprises a supervised machine learning-based model that was trained using a training set of health status data labeled with trustworthiness indexes.

5. The method as in claim 1, wherein the health status data indicative of the health status of the data source comprises one or more of: a count of dropped telemetry packets of the provided telemetry data, resource utilization by the data source, a response delay of Simple Network Management Protocol (SNMP) queries associated with the data source, or a duration of time associated with performing an SNMP walk of the data source.

6. The method as in claim 1, further comprising:
 controlling, by the device, a frequency at which the health status data is reported to the device.

7. The method as in claim 1, wherein the data source comprises a switch, router, network access point, or wireless controller in the network.

8. The method as in claim 1, further comprising:
 disabling, by the device, analysis of at least a portion of the telemetry data by the network analyzer based on the trustworthiness index computed for the telemetry data provided by the data source.

9. The method as in claim 1, wherein the health status data differs from the telemetry data, and wherein the telemetry data is indicative of a behavior of one or more devices in the network that differ from the data source.

10. The method as in claim 1, further comprising:
 analyzing, by the device, the telemetry data using the network analyzer with the one or more adjusted parameters to determine a configuration change for the network; and
 implementing, by the device, the determined configuration change for the network.

11. An apparatus, comprising:
 one or more network interfaces to communicate with a network;
 a processor coupled to the network interfaces and configured to execute one or more processes; and
 a memory configured to store a process executable by the processor, the process when executed configured to:
  receive health status data indicative of a health status of a data source in a network that provides collected telemetry data from the network for analysis by a machine learning-based network analyzer;
  maintain a performance model for the data source that models the health of the data source;

compute a trustworthiness index for the telemetry data provided by the data source based on the received health status data and the performance model for the data source; and adjust, based on the computed trustworthiness index for the telemetry data provided by the data source, one or more parameters used by the machine learning-based network analyzer to analyze the telemetry data provided by the data source.

12. The apparatus as in claim 11, wherein the one or more parameters used by the machine learning-based network analyzer to analyze the telemetry data provided by the data source comprise one or more weightings applied to the telemetry data.

13. The apparatus as in claim 11, wherein the performance model for the data source that models the health of the data source comprises an unsupervised machine learning-based model that determines a likeliness of the health status being observed for the data source.

14. The apparatus as in claim 11, wherein the performance model for the data source that models the health of the data source comprises a supervised machine learning-based model that was trained using a training set of health status data labeled with trustworthiness indexes.

15. The apparatus as in claim 11, wherein the health status data indicative of the health status of the data source comprises one or more of: a count of dropped telemetry packets of the provided telemetry data, resource utilization by the data source, a response delay of Simple Network Management Protocol (SNMP) queries associated with the data source, or a duration of time associated with performing an SNMP walk of the data source.

16. The apparatus as in claim 11, wherein the process when executed is further configured to:

dynamically adjust which health status data is received based on the telemetry data from the data source that is analyzed by the machine learning-based network analyzer.

17. The apparatus as in claim 11, wherein the process when executed is further configured to:

disable analysis of at least a portion of the telemetry data by the network analyzer based on the trustworthiness index computed for the telemetry data provided by the data source.

18. The apparatus as in claim 11, wherein the health status data differs from the telemetry data, and wherein the telemetry data is indicative of a behavior of one or more devices in the network that differ from the data source.

19. The apparatus as in claim 11, wherein the process when executed is further configured to:

analyze the telemetry data using the network analyzer with the one or more adjusted parameters to determine a configuration change for the network; and implement the determined configuration change for the network.

20. A tangible, non-transitory, computer-readable medium storing program instructions that cause a device to execute a process comprising:

receiving, at the device, health status data indicative of a health status of a data source in a network that provides collected telemetry data from the network for analysis by a machine learning-based network analyzer;

maintaining, by the device, a performance model for the data source that models the health of the data source;

computing, by the device, a trustworthiness index for the telemetry data provided by the data source based on the received health status data and the performance model for the data source; and adjusting, by the device and based on the computed trustworthiness index for the telemetry data provided by the data source, one or more parameters used by the machine learning-based network analyzer to analyze the telemetry data provided by the data source.

* * * * *